US012649843B2

(12) United States Patent
Van Mierloo et al.

(10) Patent No.: US 12,649,843 B2
(45) Date of Patent: Jun. 9, 2026

(54) POLYETHYLENE COMPOSITION FOR USE WITH RECYCLED POLYETHYLENE

(71) Applicant: SABIC GLOBAL TECHNOLOGIES B.V., Bergen Op Zoom (NL)

(72) Inventors: Sarah Van Mierloo, Opglabbeek (BE); Seda Cantekin, Maastricht (NL); Thei Rauch, Vlodrop (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 669 days.

(21) Appl. No.: 17/769,156

(22) PCT Filed: Oct. 13, 2020

(86) PCT No.: PCT/EP2020/078763
§ 371 (c)(1),
(2) Date: Apr. 14, 2022

(87) PCT Pub. No.: WO2021/074140
PCT Pub. Date: Apr. 22, 2021

(65) Prior Publication Data
US 2024/0110041 A1     Apr. 4, 2024

(30) Foreign Application Priority Data
Oct. 15, 2019    (EP) ..................................... 19203357

(51) Int. Cl.
*C08K 5/134*        (2006.01)
*C08K 5/098*        (2006.01)
*C08K 5/25*         (2006.01)
*C08K 5/526*        (2006.01)

(52) U.S. Cl.
CPC ............ *C08K 5/1345* (2013.01); *C08K 5/098* (2013.01); *C08K 5/25* (2013.01); *C08K 5/526* (2013.01)

(58) Field of Classification Search
CPC ......... C08L 23/00; C08L 23/06; C08K 5/098; C08K 5/13; C08K 5/526; C08K 5/524; C08K 5/25; C08F 2500/07
See application file for complete search history.

(56) References Cited

U.S. PATENT DOCUMENTS

| | | | | |
|---|---|---|---|---|
| 6,326,434 B1 * | 12/2001 | Lee | .......................... | C08L 23/16 |
| | | | | 525/194 |
| 7,875,663 B2 * | 1/2011 | Keck-Antoine | ........ | E04G 21/16 |
| | | | | 524/378 |
| 2002/0040081 A1 * | 4/2002 | Stein | ...................... | C08K 5/526 |
| | | | | 524/334 |
| 2016/0032078 A1 * | 2/2016 | Torchia | .................... | C08K 5/52 |
| | | | | 524/153 |

FOREIGN PATENT DOCUMENTS

| | | | |
|---|---|---|---|
| EP | 3428228 A1 | | 1/2019 |
| GB | 2252324 A | | 8/1992 |
| KR | 2010050105 A | * | 5/2010 |

OTHER PUBLICATIONS

Machine translation of KR 2010050105 (2010, 6 pages).*
International Search Report for International Application No. PCT/EP2020/078763, International Filing Date Oct. 13, 2020, Date of Mailing, Feb. 5, 2021, 5 pages.
Written Opinion for International Application No. PCT/EP2020/078763, International Filing Date Oct. 13, 2020, Date of Mailing, Feb. 5, 2021, 6 pages.

* cited by examiner

Primary Examiner — Brieann R Johnston
(74) Attorney, Agent, or Firm — CANTOR COLBURN LLP

(57) ABSTRACT

The present invention relates to a polyethylene composition comprising a polyethylene, preferably ≥95.0 wt % of polyethylene, and further (a) ≥100 and ≤500 ppm of a phenolic antioxidant; (b) ≥500 and ≤2500 ppm of an organic phosphite stabiliser; and (c) ≥500 and ≤2500 ppm of a metal stearate with regard to the total weight of the polyethylene composition. Such polyethylene composition, when used in a moulding process with PCR polyethylene, results in a reduction of the quantity of degradation products formed, which may be observed as a reduction of die deposits.

12 Claims, No Drawings

POLYETHYLENE COMPOSITION FOR USE WITH RECYCLED POLYETHYLENE

CROSS REFERENCE TO RELATED APPLICATIONS

This application is a National Stage application of PCT/EP2020/078763, filed Oct. 13, 2020, which claims the benefit of European Application No. 19203357.9, filed Oct. 15, 2019, both of which are incorporated by reference in their entirety herein FIELD The present invention relates to a polyethylene composition that is suitable for use in combination with recycled polyethylene materials. The invention further relates to a composition of polyethylene comprising recycled polyethylene materials, and articles comprising such compositions.

BACKGROUND

In view of current market developments that seek for reduction of environmental footprint in the value chain of materials, including polymer materials, there is an ongoing drive to re-use materials, and to reduce the quantity of 'new' materials that are used in the production of a variety of articles.

In the field of applications of polymer materials, this translates to a desire to recycle materials and to reduce the quantity of so-called 'virgin' polymer material, i.e. polymer material that is provided as new polymers obtained from polymerisation processes, such as from polymerisation processes of fossil materials-based monomeric materials.

For example, it is desired to increase the quantity of recycle materials in polymer compositions wherein such recycle materials originate from a previous end-consumer use of an application of the polymer. Such recycle materials are commonly referred to as 'post-consumer recyclate or regrind' or PCR materials.

However, given that such PCR materials have been previously subjected to steps including both the processing of the material into the desired application, the use in the application itself, and a processing after collection from the consumer into a form that renders it suitable for recycling, which may include for example shredding, cleaning and extrusion steps, the material characteristics of the PCR materials tend to deteriorate to a certain degree.

Such deterioration may result in the forming of degradation products during the use of such PCR materials in a shaping process for forming a new article from the PCR materials. Such shaping process typically involves a melt processing step, wherein the polymer material is molten, and shaped into a new object form prior to consolidation. A particular suitable process that is employed therein is extrusion blow moulding, by means of which objects such as bottles may be formed. Degradation products that emerge during such process may form deposits on the outlet of the melt processing equipment, typically referred to as die deposit.

When such die deposit excessively occurs, the blow moulding process needs to be halted, and the equipment cleaned. This has a detrimental effect on the process efficiency. Would the die deposits not be removed, it would result in defects in the polymer bottles that are produced, which may be both in the form of discolorations or as physical defects, resulting in rejected objects.

SUMMARY

Accordingly, it is required that the formation of such degradation products during injection blow moulding is minimised. Still, there is also the objective of being able to utilise a certain high quantity of PCR materials in the process, in view of a.o. circular materials efficiency and environmental concerns.

A solution for that has now been provided according to the present invention by a polyethylene composition comprising a polyethylene, preferably ≥95.0 wt % of polyethylene, and further (a) ≥100 and ≤500 ppm of a phenolic antioxidant;

(b) ≥500 and ≤2500 ppm of an organic phosphite stabiliser; and (c) ≥500 and ≤2500 ppm of a metal stearate with regard to the total weight of the polyethylene composition.

Such polyethylene composition, when used in a moulding process with PCR polyethylene, results in a reduction of the quantity of degradation products formed, which may be observed as a reduction of die deposits.

DETAILED DESCRIPTION

The polyethylene composition may for example comprise ≥100 and ≤500 ppm of the phenolic antioxidant (a), preferably ≥100 and ≤300 ppm, more preferably ≥150 and ≤250 ppm. The polyethylene composition may for example comprise ≥500 and ≤2500 ppm of the organic phosphite stabiliser (b), preferably ≥500 and ≤2000 ppm, more preferably ≥750 and ≤1500 ppm. The polyethylene composition may for example comprise ≥500 and ≤2500 ppm of the metal stearate, preferably ≥500 and ≤2000, more preferably ≥750 and ≤1500 ppm.

The polyethylene may for example be (i) a high-density polyethylene having a density of ≥945 and ≤970 kg/m$^3$, preferably ≥950 and ≤960;

(ii) a low density polyethylene produced by free-radical polymerisation having a density of ≥900 and ≤925 kg/m$^3$, preferably ≥910 and ≤920;

(iii) a linear low-density polyethylene having a density of ≥870 and ≤925 kg/m$^3$, preferably ≥905 and ≤922;

(iv) a medium-density polyethylene having a density of ≥926 and ≤944 kg/m$^3$, preferably ≥930 and ≤940;

or a combination thereof; wherein the density is determined in accordance with ASTM D792 (2008).

It is preferred that the phenolic antioxidant comprises 1-4 phenolic moieties, such as 2, 3 or 4 phenolic moieties, preferably ≥2. It is preferred that the phenolic moieties are 3,5-bis(t-butyl)-4-hydroxybenzene moieties. For example, the phenolic antioxidant may comprise 1-4 phenolic moieties where in the phenolic moieties are 3,5-bis(t-butyl)-4-hydroxybenzene moieties.

For example, the phenolic antioxidant may be selected from octadecyl-3-(3,5-di-tert-butyl-4-hydroxyphenyl) propionate, isooctyl 3 (3,5 di t butyl 4 hydroxyphenyl)propionate, tri ethylene glycol bis 3 (t butyl 4 hydroxy 5 methyl phenyl) propionate, 1,6 hexane diol bis 3 (3,5 di t butyl 4 hydroxyphenyl) propionate, 2,2'-methylenebis (6-t-butyl-4-methylphenol), 2,2'-methylenebis (4-ethyl-6-t-butylphenol), 2,2'-isobutylidenebis (4,6-dimethylphenol), pentaerythritol tetrakis(3 (3,5 di t butyl 4 hydroxyphenyl)propionate), tris (3,5 di t butyl 4 hydroxybenzyl)isocyanurate, 1,3,5 trimethyl 2,4,6 tris(3,5 di t butyl 4 hydroxybenzyl)benzene, pentaerythritol tetrakis(3 (3,5 di t butyl 4 hydroxyphenyl)propionate, 1,3,5 trimethyl 2,4,6 tris(3,5 di t butyl 4 hydroxybenzyl)benzene, butyric acid-3,3 bis(3 t butyl 4 hydroxyphenyl)ethylene ester, 1,3,5 tris(3',5' di t butyl 4' hydroxybenzyl) s triazine-2,4,6 (1H,3H,5H)trione, and 1,3,5 tris(4 t butyl 2,6 dimethyl 3 hydroxy benzyl) iso cyanurate, and 1,2-bis(3,5-di-tert-butyl-4-hydroxyhydrocinnamoyl)hydrazide, preferably ≥1,2-bis(3,5-di-tert-butyl-4-hydroxyhydrocinnamoyl)hydrazide.

For example, the polyethylene composition may comprise ≥100 and ≤500 ppm, preferably ≥100 and ≤300 ppm, more preferably ≥150 and ≤250 ppm, of a phenolic antioxidant, wherein the phenolic antioxidant comprises 1-4 phenolic moieties, such as 2, 3 or 4 phenolic moieties, preferably ≥2. For example, the polyethylene composition may comprise ≥100 and ≤500 ppm, preferably ≥100 and ≤300 ppm, more preferably ≥150 and ≤250 ppm, of a phenolic antioxidant, wherein the phenolic antioxidant comprises 1-4 phenolic moieties where in the phenolic moieties are 3,5-bis(t-butyl)-4-hydroxybenzene moieties.

For example, the polyethylene composition may comprise ≥100 and ≤500 ppm, preferably ≥100 and ≤300 ppm, wherein the phenolic antioxidant may be selected from octadecyl-3-(3,5-di-tert-butyl-4-hydroxyphenyl) propionate, isooctyl 3 (3,5 di t butyl 4 hydroxyphenyl)propionate, tri ethylene glycol bis 3 (t butyl 4 hydroxy 5 methyl phenyl) propionate, 1,6 hexane diol bis 3 (3,5 di t butyl 4 hydroxyphenyl) propionate, 2,2'-methylenebis (6-t-butyl-4-methylphenol), 2,2'-methylenebis (4-ethyl-6-t-butylphenol), 2,2'-isobutylidenebis (4,6-dimethylphenol), pentaerythritol tetrakis(3 (3,5 di t butyl 4 hydroxyphenyl)propionate, tris (3,5 di t butyl 4 hydroxybenzyl)isocyanurate, 1,3,5 trimethyl 2,4,6 tris(3,5 di t butyl 4 hydroxybenzyl)benzene, pentaerythritol tetrakis(3 (3,5 di t butyl 4 hydroxyphenyl)propionate, 1,3,5 trimethyl 2,4,6 tris(3,5 di t butyl 4 hydroxybenzyl)benzene, butyric acid-3,3 bis(3 t butyl 4 hydroxyphenyl)ethylene ester, 1,3,5 tris(3',5' di t butyl 4' hydroxybenzyl) s triazine-2,4,6 (1H,3H,5H)trione, and 1,3,5 tris(4 t butyl 2,6 dimethyl 3 hydroxy benzyl) iso cyanurate, and 1,2-bis(3,5-di-tert-butyl-4-hydroxyhydrocinnamoyl)hydrazide.

For example, the polyethylene composition may comprise ≥100 and ≤500 ppm, preferably ≥100 and ≤300 ppm, wherein the phenolic antioxidant is 1,2-bis(3,5-di-tert-butyl-4-hydroxyhydrocinnamoyl)hydrazide.

The organic phosphite stabiliser may for example be a triphosphite, preferably a triphosphite comprising 1, 2 or 3 moieties, preferably comprising one or more a substituted or unsubstituted phenyl moieties, such as bis-t-butyl phenyl moieties.

The organic phosphite stabiliser may for example be selected from tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, distearylpentaerythritol diphosphite, bis(2,6-di-tert-butyl-4-methylphenyl) pentaerythritol diphosphite, bis(2,4,6-tri-tert-butylphenyl) pentaerythritol diphosphite, tetrakis(2,4-di-tert-butylphenyl) 4,4'-biphenylenediphosphonite, and bis(2,4-di-tert-butyl-6-methylphenyl) ethyl phosphite, preferably tris(2,4-di-tert-butylphenyl) phosphite.

Preferably, the organic phosphite stabiliser is tris(2,4-di-tert-butylphenyl) phosphite.

The polyethylene composition may for example comprise ≥500 and ≤2500 ppm of the organic phosphite stabiliser (b), preferably ≥500 and ≤2000 ppm, more preferably ≥750 and ≤1500 ppm, wherein the organic phosphite stabiliser is a triphosphite, preferably a triphosphite comprising 1, 2 or 3 moieties, preferably comprising one or more a substituted or unsubstituted phenyl moieties, such as bis-t-butyl phenyl moieties.

The polyethylene composition may for example comprise ≥500 and ≤2500 ppm of the organic phosphite stabiliser (b), preferably ≥500 and ≤2000 ppm, more preferably ≥750 and ≤1500 ppm, wherein the organic phosphite stabiliser is selected from tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, distearylpentaerythritol diphosphite, bis(2,6-di-tert-butyl-4-methylphenyl) pentaerythritol diphosphite, bis(2,4,6-tri-tert-butylphenyl) pentaerythritol diphosphite, tetrakis(2,4-di-tert-butylphenyl) 4,4'-biphenylenediphosphonite, and bis(2,4-di-tert-butyl-6-methylphenyl) ethyl phosphite.

The polyethylene composition may for example comprise ≥500 and ≤2500 ppm of the organic phosphite stabiliser (b), preferably ≥500 and ≤2000 ppm, more preferably ≥750 and ≤1500 ppm, wherein the organic phosphite stabiliser is tris(2,4-di-tert-butylphenyl) phosphite.

The metal stearate may for example be selected from calcium stearate, magnesium stearate, aluminium stearate, and lithium stearate. It is preferred that the metal stearate is calcium stearate.

The polyethylene composition may for example comprise ≥500 and ≤2500 ppm of the metal stearate, preferably ≥500 and ≤2000, more preferably ≥750 and ≤1500 ppm, wherein the metal stearate may for example be selected from calcium stearate, magnesium stearate, aluminium stearate, and lithium stearate. The polyethylene composition may for example comprise ≥500 and ≤2500 ppm of the metal stearate, preferably ≥500 and ≤2000, more preferably ≥750 and ≤1500 ppm, wherein the metal stearate is calcium stearate.

The polyethylene composition may for example comprise:

≥80.0, preferably ≥95.0 wt %, of the high-density polyethylene (i);

≥80.0, preferably ≥95.0 wt %, wt % of the low-density polyethylene(ii);

≥80.0, preferably ≥95.0 wt %, wt % of the linear low-density polyethylene (iii); or ≥80.0, preferably ≥95.0 wt %, wt % of the medium-density polyethylene (iv) with regard to the total weight of the polyethylene composition.

Preferably, the polyethylene composition comprises the high-density polyethylene (i), the low-density polyethylene (ii), the linear low-density polyethylene (iii), or the medium-density polyethylene (iv) as the sole polyethylene material in the composition.

In a particular embodiment of the invention, the polyethylene composition consists essentially of or consists of:

the high-density polyethylene (i), the low-density polyethylene (ii), the linear low-density polyethylene (iii), or the medium-density polyethylene (iv);

the phenolic antioxidant;

the phosphite stabiliser; and the metal stearate.

In a further particular embodiment of the invention, the polyethylene composition consists of:

the high-density polyethylene (i), the low-density polyethylene (ii), the linear low-density polyethylene (iii), or the medium-density polyethylene (iv);

the phenolic antioxidant, wherein the phenolic antioxidant is 1,2-bis(3,5-di-tert-butyl-4-hydroxyhydrocinnamoyl) hydrazide;

the phosphite stabiliser, wherein the phosphite stabiliser is tris(2,4-di-tert-butylphenyl) phosphite; and the metal stearate, wherein the metal stearate is calcium stearate.

It is particularly preferred that the polyethylene is the high-density polyethylene (i).

The invention also relates to an embodiment wherein the polyethylene composition consists of:

the high-density polyethylene (i);

the phenolic antioxidant, wherein the phenolic antioxidant is 1,2-bis(3,5-di-tert-butyl-4-hydroxyhydrocinnamoyl) hydrazide;

the phosphite stabiliser, wherein the phosphite stabiliser is tris(2,4-di-tert-butylphenyl) phosphite; and the metal stearate, wherein the metal stearate is calcium stearate.

It is preferred that the polyethylene has a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and/or $\geq 25.0$ and $\leq 100.0$ g/10 min under a load of 21.6 kg.

For example, the polyethylene may have a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and $\geq 25.0$ and $\leq 100.0$ g/10 min under a load of 21.6 kg.

The polyethylene may for example have a melt-mass flow rate of $\geq 0.1$ and $\leq 2.0$ g/10 min under a load of 2.16 kg, preferably $\geq 0.2$ and $\leq 1.5$, more preferably $\geq 0.2$ and $\leq 1.0$. The polyethylene may for example have a melt-mass flow rate of $\geq 1.0$ and $\leq 10.0$ g/10 min under a load of 5.0 kg, preferably $\geq 1.0$ and $\leq 5.0$ g/10 min, more preferably $\geq 2.0$ and $\leq 5.0$ g/10 min. The polyethylene may for example have a melt-mass flow rate of $\geq 25.0$ and $\leq 100.0$ g/10 min under a load of 21.6 kg, preferably $\geq 25.0$ and $\leq 75.0$ g/10 min, more preferably $\geq 30.0$ and $\leq 50.0$ g/10 min.

It is preferred that the high-density polyethylene has a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and/or $\geq 25.0$ and $\leq 100.0$ g/10 min under a load of 21.6 kg.

For example, the high-density polyethylene may have a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and $\geq 25.0$ and $\leq 100.0$ g/10 min under a load of 21.6 kg.

The high-density polyethylene may for example have a melt-mass flow rate of $\geq 0.1$ and $\leq 2.0$ g/10 min under a load of 2.16 kg, preferably $\geq 0.2$ and $\leq 1.5$, more preferably $\geq 0.2$ and $\leq 1.0$. The high-density polyethylene may for example have a melt-mass flow rate of $\geq 1.0$ and $\leq 10.0$ g/10 min under a load of 5.0 kg, preferably $\geq 1.0$ and $\leq 5.0$ g/10 min, more preferably $\geq 2.0$ and $\leq 5.0$ g/10 min. The high-density polyethylene may for example have a melt-mass flow rate of $\geq 25.0$ and $\leq 100.0$ g/10 min under a load of 21.6 kg, preferably $\geq 25.0$ and $\leq 75.0$ g/10 min, more preferably $\geq 30.0$ and $\leq 50.0$ g/10 min.

It is preferred that the low-density polyethylene has a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and/or $\geq 25.0$ and $\leq 100.0$ g/10 min under a load of 21.6 kg.

For example, the low-density polyethylene may have a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and $\geq 25.0$ and $\leq 100.0$ g/10 min under a load of 21.6 kg.

The low-density polyethylene may for example have a melt-mass flow rate of $\geq 0.1$ and $\leq 2.0$ g/10 min under a load of 2.16 kg, preferably $\geq 0.2$ and $\leq 1.5$, more preferably $\geq 0.2$ and $\leq 1.0$. The low-density polyethylene may for example have a melt-mass flow rate of $\geq 1.0$ and $\leq 10.0$ g/10 min under a load of 5.0 kg, preferably $\geq 1.0$ and $\leq 5.0$ g/10 min, more preferably $\geq 2.0$ and $\leq 5.0$ g/10 min. The low-density polyethylene may for example have a melt-mass flow rate of $\geq 25.0$ and $\leq 100.0$ g/10 min under a load of 21.6 kg, preferably $\geq 25.0$ and $\leq 75.0$ g/10 min, more preferably $\geq 30.0$ and $\leq 50.0$ g/10 min.

It is preferred that the linear low-density polyethylene has a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and/or $\geq 25.0$ and $\leq 100.0$ g/10 min under a load of 21.6 kg.

For example, the linear low-density polyethylene may have a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and $\geq 25.0$ and $\leq 100.0$ g/10 min under a load of 21.6 kg.

The linear low-density polyethylene may for example have a melt-mass flow rate of $\geq 0.1$ and $\leq 2.0$ g/10 min under a load of 2.16 kg, preferably $\geq 0.2$ and $\leq 1.5$, more preferably $\geq 0.2$ and $\leq 1.0$. The linear low-density polyethylene may for example have a melt-mass flow rate of $\geq 1.0$ and $\leq 10.0$ g/10 min under a load of 5.0 kg, preferably $\geq 1.0$ and $\leq 5.0$ g/10 min, more preferably $\geq 2.0$ and $\leq 5.0$ g/10 min. The linear low-density polyethylene may for example have a melt-mass flow rate of $\geq 25.0$ and $\leq 100.0$ g/10 min under a load of 21.6 kg, preferably $\geq 25.0$ and $\leq 75.0$ g/10 min, more preferably $\geq 30.0$ and $\leq 50.0$ g/10 min.

It is preferred that the medium-density polyethylene has a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and/or $\geq 25.0$ and $\leq 100.0$ g/10 min under a load of 21.6 kg.

For example, the medium-density polyethylene may have a melt-mass flow rate of:

$\geq 0.1$ and $\leq 2.0$ g/10 min under a load of 2.16 kg;

$\geq 1.0$ and $\leq 10.0$ g/10 min under a load of 5.0 kg; and $\geq 25.0$ and $\leq 100.0$ g/10 min under a load of 21.6 kg.

The medium-density polyethylene may for example have a melt-mass flow rate of $\geq 0.1$ and $\leq 2.0$ g/10 min under a load of 2.16 kg, preferably $\geq 0.2$ and $\leq 1.5$, more preferably $\geq 0.2$ and $\leq 1.0$. The medium-density polyethylene may for example have a melt-mass flow rate of $\geq 1.0$ and $\leq 10.0$ g/10 min under a load of 5.0 kg, preferably $\geq 1.0$ and $\leq 5.0$ g/10 min, more preferably $\geq 2.0$ and $\leq 5.0$ g/10 min. The medium-density polyethylene may for example have a melt-mass flow rate of $\geq 25.0$ and $\leq 100.0$ g/10 min under a load of 21.6 kg, preferably $\geq 25.0$ and $\leq 75.0$ g/10 min, more preferably $\geq 30.0$ and $\leq 50.0$ g/10 min.

In the context of the present invention, the melt mass-flow rate is determined in accordance with ASTM D1238 (2013) at a temperature of 190° C.

The present invention also relates, in a certain embodiment, to a polymer formulation comprising the polyethylene composition and a post-consumer recyclate or regrind (PCR) polyethylene material, wherein the PCR material has a density that differs from the density of the polyethylene in the polyethylene composition by at most 20 kg/m$^3$, preferably at most 10 kg/m$^3$, more preferably at most 5 kg/m$^3$.

It is preferred that the polymer formulation comprises 20.0 wt % preferably $\geq 20.0$ and $\leq 80.0$ wt %, of the PCR material, with regard to the total weight of the polymer formulation. For example, the polymer formulation may comprise $\geq 30.0$ and $\leq 65.0$ wt % of the PCR, such as 30.0 and $\leq 50.0$ wt %, or 45.0 and $\leq 65.0$ wt %.

It is preferred that the polymer formulation comprises 20.0 wt %, preferably $\geq 20.0$ and $\leq 80.0$ wt %, of the polyethylene composition, with regard to the total weight of the polymer formulation, more preferably ≥30.0 and ≤65.0 wt %.

The invention also relates to an article comprising the polymer formulation, preferably wherein the article is produced by blow-moulding, more preferably wherein the article is a bottle for holding potable liquids.

The invention further also relates to the use of the polyethylene composition for reduction of degradation products in continuous moulding processes in the manufacturing of moulded articles, preferably bottles, from a polymer formulation comprising a post-consumer recyclate or regrind polyethylene material.

The invention will now be illustrated by the following non-limiting examples.

The following polyethylene compositions were used in the examples of the invention:

| Material | | Example 1 | 2 (c) | 3 (c) |
|---|---|---|---|---|
| Polyethylene | SABIC HDPE 6246LS | 99.8 wt % | 99.9 wt % | 100.0 wt % |
| Phenolic antioxidant | Lowinox MD 24 | 160 ppm | 80 ppm | — |
| Organic phosphite stabiliser | Irgafos 168 | 840 ppm | 420 ppm | — |
| Metal stearate | Ca stearate | 1000 ppm | 500 ppm | — |

The polyethylene compositions were prepared by melt extrusion of the materials as per each of the compositions described above, to obtain polymer pellets according to the above compositions. The wt % of the polyethylene relates to the total weight of the polyethylene composition, the ppm of the additives also relate to the total weight of the polyethylene composition.

Using the polymer compositions as prepared, trials were conducted by blow moulding of bottles. In the blow moulding trials, polymer formulations were used comprising the polyethylene compositions 1-3 as above, and a quantity of post-consumer high-density polyethylene regrind material (PCR). The results of the trials are presented below.

| Trial | A | B | C | D |
|---|---|---|---|---|
| Polyethylene composition | 60 wt % of example 1 | 40 wt % of example 1 | 60 wt % of example 2 | 60 wt % of example 3 |
| PCR | 40 wt % | 60 wt % | 40 wt % | 40 wt % |
| Die deposit | No | No | 2 hrs | 2 hrs |

From the trials, it was observed that in trials A and B, no die deposit was formed after 5 hours of continuous operation. In trials C and D, after 2 hours die deposits were formed in such quantities that required the operation to be halted and the die surfaces to be cleaned prior to further commencing the moulding operations. Die deposits are an accumulation of degradation products that form during the moulding process from the polymer material. It can be understood that the use of the polyethylene composition of the present invention resulted in a reduction of the die deposits to occur.

The invention claimed is:

1. A polyethylene composition comprising a polyethylene and further
  (a) ≥150 and ≤250 ppm of a phenolic antioxidant, wherein the phenolic antioxidant is 1,2-bis(3,5-di-tert-butyl-4-hydroxyhydrocinnamoyl)hydrazide;
  (b) ≥750 and ≤1500 ppm of an organic phosphite stabiliser, wherein the organic phosphite stabiliser is a triphosphite; and
  (c) ≥500 and ≤2500 ppm of a metal stearate
with regard to the total weight of the polyethylene composition,
  wherein the polyethylene composition comprises a high-density polyethylene having a density of ≥945 and ≤970 kg/m³, wherein the density is determined in accordance with ASTM D792 (2008), and a melt-mass flow rate of:
    ≥0.1 and ≤2.0 g/10 min under a load of 2.16 kg;
    ≥1.0 and ≤10.0 g/10 min under a load of 5.0 kg; and/or
    ≥25.0 and ≤100.0 g/10 min under a load of 21.6 kg
  as determined in accordance with ASTM D1238 (2013) at a temperature of 190° C.

2. The polyethylene composition according to claim 1, wherein the metal stearate is selected from calcium stearate, magnesium stearate, aluminum stearate, or lithium stearate.

3. The polyethylene composition according to claim 1, wherein the composition comprises:
  ≥80.0 wt % of the high-density polyethylene;
  with regard to the total weight of the polyethylene composition.

4. The polyethylene composition according to claim 1, wherein the composition comprises the high-density polyethylene as the sole polyethylene material in the composition.

5. The polyethylene composition according to claim 1, wherein the composition consists essentially of:
  the high-density polyethylene;
  the phenolic antioxidant;
  the phosphite stabiliser; and
  the metal stearate.

6. The polymer formulation comprising the polyethylene composition according to claim 1 and a post-consumer recyclate or regrind (PCR) polyethylene material, wherein the PCR material has a density that differs from the density of the polyethylene in the polyethylene composition by at most 20 kg/m³.

7. The polymer formulation according to claim 6, wherein the formulation comprises >20.0 wt % of the PCR material, with regard to the total weight of the polymer formulation.

8. The polymer formulation according to claim 6, wherein the formulation comprise >20.0 wt % of the polyethylene composition, with regard to the total weight of the polymer formulation.

9. An article comprising the polymer formulation according to claim 6.

10. The polyethylene composition according to claim 1 comprising ≥95.0 wt % of polyethylene.

11. The polyethylene composition according to claim 1, wherein the organic phosphite stabiliser is selected from tris (nonylphenyl) phosphite, trilauryl phosphite, trioctadecyl phosphite and tris (2,4-di-tert-butylphenyl) phosphite.

12. The polyethylene composition of claim 2, wherein the metal stearate is calcium stearate.

* * * * *